United States Patent [19]

Roth

[11] Patent Number: 4,567,050

[45] Date of Patent: Jan. 28, 1986

[54] METHOD FOR PROCESSING MEAT PRODUCTS

[76] Inventor: Eldon N. Roth, 14565 Quaker Hill Rd., Nevada City, Calif. 95959

[21] Appl. No.: 601,912

[22] Filed: Apr. 19, 1984

Related U.S. Application Data

[63] Continuation-in-part of Ser. No. 420,352, Sep. 20, 1982, abandoned, which is a continuation-in-part of Ser. No. 286,582, Jul. 24, 1981, abandoned.

[51] Int. Cl.$^4$ ............................................ A23L 1/317
[52] U.S. Cl. ..................................... 426/417; 99/483;
  426/480; 426/513; 426/516; 426/520
[58] Field of Search ............... 426/417, 478, 480, 495,
  426/513, 516, 518, 519, 520, 524; 260/412.6;
  17/45, 46; 425/202, 376 B, 377; 165/120;
  241/23, 65, 82.1, 82.5; 99/483, 484, 495, 496,
  510, 538

[56] References Cited

U.S. PATENT DOCUMENTS

| | | |
|---|---|---|
| 2,467,529 | 4/1949 | Hormel . |
| 2,745,856 | 5/1956 | Dayen et al. . |
| 2,780,968 | 2/1957 | Heys . |
| 3,008,831 | 11/1961 | Christianson . |
| 3,020,160 | 2/1962 | Downing . |
| 3,023,694 | 3/1962 | Burns . |
| 3,058,830 | 10/1962 | Christianson . |
| 3,078,165 | 2/1963 | Alberts . |
| 3,078,287 | 2/1963 | Downing . |
| 3,138,088 | 6/1964 | Foth . |
| 3,177,080 | 4/1965 | Alberts . |
| 3,345,353 | 10/1967 | Klubien . |
| 3,471,299 | 10/1969 | Duckworth et al. . |
| 3,601,039 | 8/1971 | Schover . |
| 3,613,564 | 10/1971 | Wheeling et al. . |
| 3,666,499 | 5/1972 | Whittingham et al. . |
| 3,780,191 | 12/1973 | Langer . |
| 3,904,770 | 9/1975 | Hale et al. . |
| 3,906,118 | 9/1975 | McFarland . |
| 3,979,296 | 9/1976 | Bastgen . |
| 4,098,095 | 7/1978 | Roth . |
| 4,156,384 | 5/1979 | Hinds, Jr. et al. . |
| 4,240,591 | 12/1980 | Schnell . |

OTHER PUBLICATIONS

Morse et al., "Kingan Perfects Continuous Process that Revolutionizes Fat Rendering", Food Engineering, IL 1952, 00 72–74, 175–176.

Moulton, "Inedible Rendering", Meat Magazine, 1935, 426–417.

Primary Examiner—Arthur L. Corbin
Attorney, Agent, or Firm—John A. Bucher

[57] ABSTRACT

A method and apparatus are disclosed for processing meat products containing at least a small portion of liquefiable fats or oils wherein the meat products are extruded into multiple passages or tubes of a shell-and-tube type heat exchanger for heating or cooling the meat product with the fats and/or oils providing lubrication for passage of the meat product through the heat exchanger. With the meat product being trimmings containing substantial amounts of liquefiable fats and oils, the meat product is heated to a rendering temperature within the heat exchanger, rendered or liquefied fats being separated from lean meat portions of the meat trimmings after passage from the heat exchanger, the lean meat portion preferably being immediately refrigerated in order to limit bacterial growth.

16 Claims, 1 Drawing Figure

U.S. Patent   Jan. 28, 1986   4,567,050
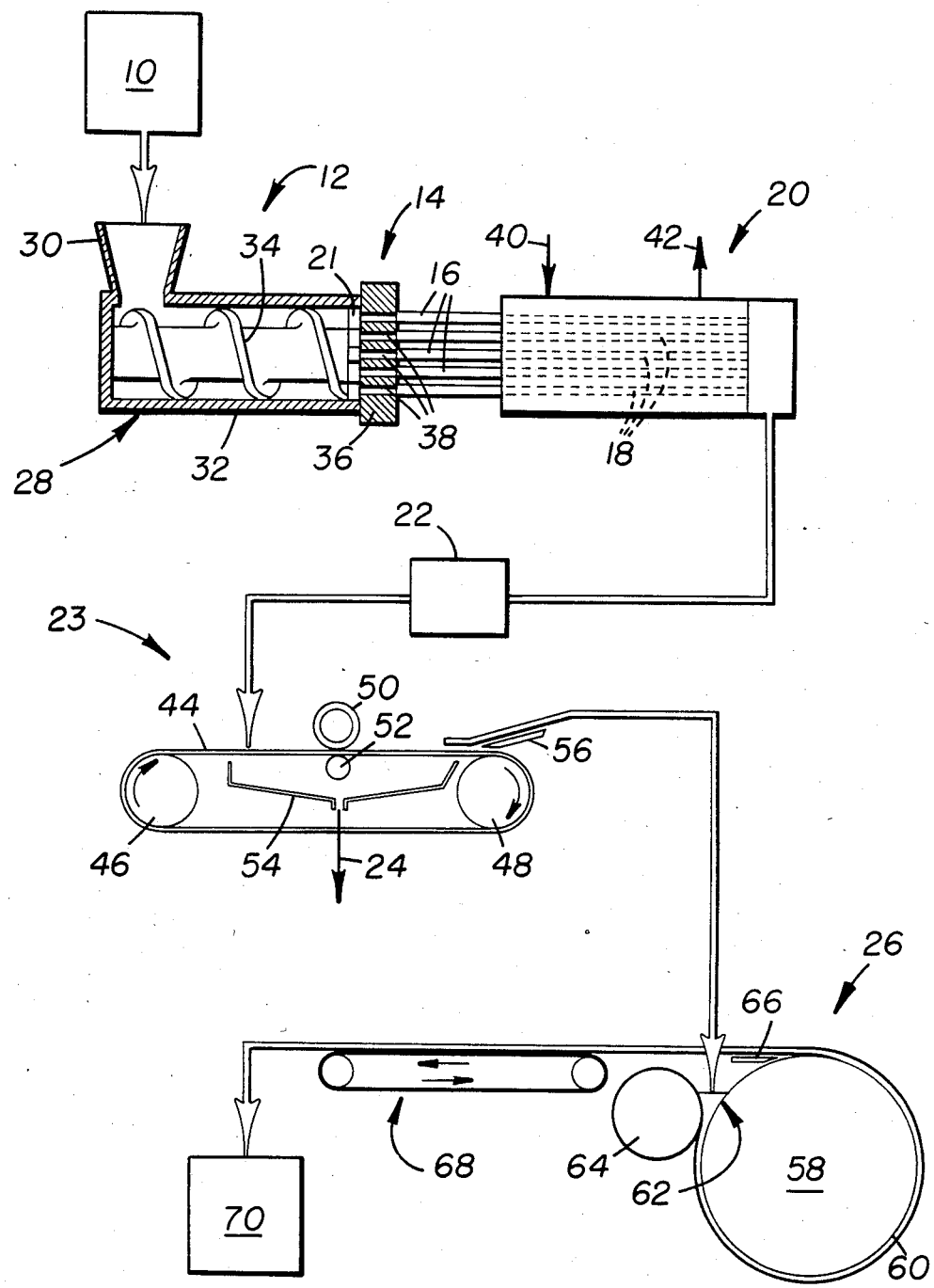

METHOD FOR PROCESSING MEAT PRODUCTS

This application is a continuation-in-part of Application Serial No. 420,352, filed September 20, 1982, now abandoned, which in turn was a continuation-in-part of Application Serial No. 286,582, filed July 24, 1981, now abandoned.

BACKGROUND OF THE INVENTION

The present invention relates to a method and apparatus for processing meat products and more particularly to a method and apparatus where the meat products are heated or cooled by passage through a shell-and-tube heat exchanger. The invention particularly contemplates the heating or cooling of such meat products in forming various edible products.

In the prior art, the processing of such meat products or the like has presented various problems. In particular, where passage of the meat products is contemplated through equipment presenting small or tortuous passages, it has been found generally necessary to first reduce the meat product to essentially a flowable or pumpable consistency in order to prevent blockage from occurring during passage of the meat product into and through the equipment components. In the context of this invention, "pumpable" is intended to mean a capability of being transferred or moved, freely or without further assistance through processing equipment by a positive displacement type pump. However, in the formation of edible components, it is important to minimize mechanical working in order to maintain the original flavor and texture of the products. It was generally found to be difficult or impossible to achieve the goal of minimum mechanical working with the product being reduced to a substantially flowable or pumpable consistency.

Also, in many prior art processes, usually because of equipment design such as surge tanks or the like preventing processing on a first-in, first-out basis, different portions of the meat products were commonly heated for different amounts of time. This also resulted in undesirable variation in flavor and texture of the finished product as well as susceptibility to bacterial growth.

Processing of various meat products, including beef, poultry, pork, etc., has often required initial separation of their lean meat portions from accompanying liquefiable components including fats and oils. Trimmings obtained from animal carcasses during butchering operations in packing houses and the like are of particular concern within the present invention because of the substantial amounts of lean meat material, both in the form of muscle and connective tissue, which is contained within the fat trimmings. Generally, such trimmings consist of large amounts of fats combined with relatively small lean meat portions in the form of muscle meat and/or connective tissue. Certain materials, particularly inedible products, may even contain bone particles which will normally remain with the lean meat component.

Furthermore, meat products of the type contemplated by the present invention may include substantial non-meat components such as vegetable or grain extenders and mixed components for certain applications. For example, the invention may be employed in the preparation of pizza toppings and other mixtures including meat products, vegetable products and/or other components as well.

The lean meat portion must often be removed from the fat portion, or the fat portion at least be reduced in percentage, in order to produce acceptable food products such as sausages, frankfurters, or chunked-and-formed jerky. In addition to beef products, it will be apparent that the invention also contemplates other meats presenting further problems as further defined therein.

At the same time, it will also be apparent that the present invention is not limited to a method and apparatus for separating lean meat and the like from liquefiable portions. For example, substantial portions of the animal carcass could be treated or processed according to the method and apparatus of the present invention in order to obtain final products including a selected percentage of lean meat. Thus, although the invention preferably contemplates processing of fat trimmings including substantial amounts of fat or the like and as little as 2 to 20% lean meat, the invention may also be employed in the processing of meat trimmings or products including substantially greater amounts of lean meat and possibly bone particles or ash.

The difficulty in processing meat products of the type referred to above arises generally from the need in certain applications for first removing at least a portion of the liquefiable fat in order to achieve a satisfactory proportion of lean meat and fat for use in various food products. In the past, meat products, such as beef trimmings including unacceptably high percentages of fat, have conventionally been separated in rendering processes where the fat and lean meat portions are heated to a suitable temperature in order to render or liquefy the fats and oils in order to facilitate their separation from the lean meat portion. The lean meat portion has commonly been separated from the rendered fats and oils for example in centrifuges. However, problems have arisen because of the need for first heating the meat products to a suitable temperature in order to render the fats and oils. Since the lean meat portion is heated at the same time, it becomes particularly susceptible to bacterial growth which undesirably affects its quality for use in various food products.

The prior art processes and problems summarized above are particularly contemplated by the present invention in connection with the handling of relatively large chunks or pieces of meat products which must be rapidly and efficiently processed in order to produce a resulting meat product of the highest possible quality. The large pieces of meat may have a major dimension of up to 15 or 20 inches, for example, typically in the form of fat trimmings from slaughterhouse operations.

In some applications, it may be desirable to further process the fat trimmings, for example, by heating, in order to remove a substantial portion of the fat and recover the remaining lean meat portion. On the other hand, such fat trimmings may be combined with other components and then cooled to form a meat product such as sausage having a relatively high fat content. In either type of application, it is desirable to achieve the respective end product with relatively minimum mechanical working which normally tends to undesirably impair the texture or quality of the product.

At the same time, typical processing equipment, of a type including tube type heat exchangers, requires movement of the meat products into and through passages which are generally restricted or tortuous. The large pieces of meat products referred to above cannot be introduced in that form into such equipment since they cannot be readily caused to continuously enter the restricted passages.

The lean meat portions comprise fiber having a tendency to amass or pile up at the entrance to the restrictive passages. Even if the individual fibers or fiber chains are of a size suitable for entering the restricted passages, groups of the fibers or fiber chains often interact to form a larger mass which cannot readily be pumped or moved into the passages. Also, individual fibers or chains may be compressed in an "accordion effect" which substantially increases their effective size and further adds to the problem of blockage.

Because of this problem, most prior art processes dealing with meat products of the type contemplated by the present invention first reduce the meat products to a generally flowable or pumpable condition so that it can be caused to enter such restrictive passages by means of a pump or the like without further assistance. However, blockage commonly occurs in such processing equipment even with the product being in such a flowable condition.

Prior art processes such as those set forth above have been found to be relatively inefficient either in terms of the design of the equipment or in the method in which the meat products are processed and the resulting quality of the meat products. Accordingly. there has been found to remain a need for a method and apparatus for efficiently and effectively heating or cooling meat products and the like and more particularly for processing meat trimmings and the like in order to separate and recover lean meat portions.

SUMMARY OF THE INVENTION

It is therefore an object of the invention to provide a method and apparatus for processing meat products while avoiding one or more of the problems set forth above.

More particularly, it is an object of the invention to provide a method of processing meat products and the like which are characterized by the presence of individual pieces including fibers tending to amass and block passage of the meat product into restricted passages of processing equipment, the present invention contemplating a method and apparatus for extruding the pieces of meat product directly into individual passages of a shell-and-tube type heat exchanger and at the same time facilitating passage of the pieces of meat product thereinto by knife means arranged for cutting movement adjacent an inlet end of the passages in order to prevent blockage at the inlet ends of the passages, the invention thereby applying force developed by the extrusion step for causing the meat product to pass through the shell-and-tube type heat exchanger with minimum physical working, the heat exchanger being operated for changing the temperature of the meat product to a selected level during passage of the meat product therethrough.

In meeting the preceding objective, the present invention provides a number of unique advantages in comparison with the prior art. These advantages include:

(1) minimum physical working of the meat product to result in improved quality thereof and reduced energy during processing;

(2) positive movement of the meat product from the extruder directly into and through the passages of the heat exchanger assures first-in, first-out treatment of the meat product for greater uniformity and control of heating time;

(3) more rapid heat exchange is made possible since a heat exchanger may be adapted with smaller passages through which the meat product can be forced by the extrusion step; and (4) ability of the large chunks or pieces of meat product referred to above to be introduced directly into the passages of the shell-and-tube heat exchanger through interaction of the extrusion step and knife means at the inlet ends of the passages.

It is an even further object of the invention to provide such a method and apparatus for processing meat products wherein the meat product is first divided into pieces of reduced size suitable for acceptance by extruder means adapted for extruding the meat product directly into individual passages of a shell-and-tube type heat exchanger, passage of the meat product into the heat exchanger being facilitated by knife means arranged for cutting movement adjacent an inlet and of the die opening in order to prevent blockage by the meat product, whereby said extruding step and said knife step in combination permit said meat product to be forced into and through said die openings and passages in said shell-and-tube type heat exchanger, the heat exchanger being operated for changing the temperature of the meat product to a selected level during passage of the meat product therethrough. For example, the meat product could also be divided by a grinder or the like to permit its entry into a piston type extruder communicated directly with passages of a shell-and-tube heat exchanger having knife means at the inlet ends of the passages.

It is yet a further object of the invention to provide a method and apparatus for processing meat products as summarized above wherein the meat products include sufficient liquid or liquifiable components such as fats and/or oils for providing lubrication for the meat products through passage through the heat exchanger.

As summarized above, the method and apparatus of the present invention provide a number of important advantages over the prior art. Initially, because the meat product is extruded through the separate tubes of the heat exchanger, the invention assures that the meat products remain in the heat exchanger only for a predetermined amount of time. For the same reason, the invention assures that the meat product passes through the heat exchanger on a first-in, first-out basis. In other words, various portions of the meat product remain in the heat exchanger for the same predetermined amount of time in order to precisely regulate the amount of heating experienced by all portions of the meat product. For these reasons, the method and apparatus of the present invention provide a much more sanitary process for forming end products which are characterized by minimum bacterial growth compared to the prior art.

In addition, it is again noted that, since the meat products are divided into small pieces only as necessary to permit their extruded passage through the shell-and-tube heat exchanger, they encounter minimum mechanical working in order to retain as much flavor and texture of the meat products as possible.

It is also an object of the invention to provide a method and apparatus for processing meat trimmings and the like to separate lean meat portions from fat portions by extruding the meat trimmings in an extruder having its outlet coupled directly with a plurality of separate tubes in a shell-and-tube type heat exchanger, the meat trimmings being heated within the heat exchanger in order to render the fat portions thereof and permitting subsequent substantial separation of the rendered fat portion from the remaining lean meat portion.

The invention even more preferably contemplates the use of a drum type freezer for refrigerating or preferably freezing the lean meat portion of the meat product in order to prevent or limit bacterial growth. Furthermore, the temperature of the heat exchanger may preferably be regulated as noted above in order to heat the product or to achieve rendering of the fat portion of the meat trimmings while maintaining optimum quality.

The extruding means is preferably a grinder including an extruding plate forming die openings through which the meat trimmings are forced into the plurality of conduits for passage through the heat exchanger. As noted above, meat products of the type contemplated by the present invention include fibers or tissue which are often difficult to separate during processing of the meat products. Accordingly, the present invention particularly contemplates the use of a moving knife or other means for facilitating passage of the meat product into and through the die openings of the extruding plate. Such means are provided, for example, in conventional grinders which commonly have rotating knife edges immediately adjacent their extruding plates.

Additional objects and advantages of the invention are made apparent in the following description having reference to the accompanying drawing.

BRIEF DESCRIPTION OF THE DRAWING

The drawing includes a single figure representing apparatus, partially shown in schematic form and constructed in accordance with the present invention while being suitable for also practicing the method of the invention.

DESCRIPTION OF THE PREFERRED EMBODIMENT

The present invention provides a method and apparatus for processing meat products including meat trimmings and the like in order to heat or cool the products and to preferably substantially separate their lean meat components from liquefiable components such as fats and oils.

It will be apparent from the description that the invention applies to a variety of meat products. However, the invention is described below particularly with reference to use in the processing of trimmings including relatively low percentages of lean meat and high percentages of fat. For example, the trimmings referred to above may contain approximately 2 to 90% lean meat, the remainder being fats or oils capable of liquefication by heating.

It is to be kept in mind, however, that the method and apparatus of the present invention may also be employed in connection with other meat products, particularly including meat products such as beef, pork and the like. Such meat products may also possibly include non-meat components such as vegetables or otherwise. With such products, the present invention may be employed for heating or cooling and otherwise processing the product without any need for separating or removing fats or oils.

Referring now to the drawing, apparatus of the invention includes a source of meat products or the like 10 from which the product is supplied to an extrusion device 12, preferably in the form of a grinder. The grinder has outlet means 14 for directing the extruded meat trimmings into a plurality of conduits 16 which are respectively interconnected with separate tubes 18 in a shell-and-tube type heat exchanger 20. Within the above combination, the outlet means 14 is preferably an extruder plate common to such grinders. Furthermore, the extruder plate of the grinder is directly coupled with the passages of the shell-and-tube heat exchanger. Even more preferably, the extruder plate 14 is adapted for direct communication with the passages or tubes of the heat exchanger.

As noted above, meat products of the type contemplated by the present invention are characterized by a fibrous or tissue consistency making it difficult to separate the meat product and to cause the meat product to pass into the various die openings upon the extruder plate 14. In order to assure continuous passage of the meat product through the extruder, means are provided for clearing the die openings and thereby preventing tissue or fiber portions of the meat product from "piling up" and interrupting or interfering with passage of the meat product into and through the extruder plate. The invention preferably contemplates the use of a rotating knife 21 arranged immediately adjacent the extruder plate 14 for this purpose. However, it will also be apparent that other means could also be employed for carrying out this purpose of the invention. For example, if the extruding device 12 of the invention were merely a pressurized chamber in communication with the outlet means 14, the die openings in the outlet means could also be cleared for example by means of reciprocating pistons, cutting bars or the like arranged in register with the openings of the outlet means 14.

After the extruded meat product is heated within the heat exchanger 20, free oil or liquid is separated from the lean meat portion in a pre-separator 22 which is preferably a conventional centrifuge type device. Thereafter, the lean meat portion from the meat product or trimmings along with the remaining liquefied fat portion of the meat product are passed to a final separator 23 capable of removing substantially all of the liquefied fat portion from the lean meat portion. The liquefied fat passes from the separator 23 through a conduit 24 for further treatment which is outside the scope of the present invention.

The lean meat portion of the trimmings is preferably received from the separator 23 by means 26 adapted for immediately refrigerating or preferably freezing the lean meat portion shortly after its separation from the fat portion. As was noted above, the lean meat portion is also necessarily heated during rendering of the fat portion to a relatively elevated temperature where the lean meat portion is particularly susceptible to bacterial growth. By immediately refrigerating the lean meat portion after separation from the fat portion, bacterial growth is arrested or minimized in order to further improve the quality of the lean meat portion as a food product. After refrigeration, the lean meat portion may then be further processed, for example, by packaging (not shown) or by means for using the lean meat portion in preparation of a food product of the type referred to above.

It is also to be noted that the free oil separator 22 could also be formed as an integral portion of the final separator 23 in a manner described in greater detail below.

The preceding brief description of the invention summarizes its apparatus and is believed to be sufficient for understanding thereof. However, to describe the apparatus of the invention in greater detail, the extrusion device 12 is preferably a grinder of a type including a housing 28 with means 30 for receiving the trimmings. The trimmings pass into a cylindrical portion 32 of the housing containing a rotating feed screw 34. The outlet means 14 preferably comprises an extrusion plate 36 forming a plurality of die openings 38 through which the meat trimmings are forced by extruding operation of the rotating feed screw 34. As noted above, the rotating knife 21 is arranged immediately adjacent the extruder plate 14 and is mounted for rotation with the rotating feed screw 34.

The conduits 16 are respectively interconnected with the die openings 38 and with the separate tubes 18 in the shell-and-tube type heat exchanger. The heat exchanger 20 also includes inlet and outlet means 40 and 42 respectively for circulating hot water or the like through the heat exchanger and about the tubes 20 in order to heat the meat trimmings within the tubes. This step may also render or liquefy the fat portion of the trimmings to facilitate subsequent separation of the fat portion and lean meat portion. Here again, it is particularly important to note in connection with the present invention that the meat product preferably includes sufficient liquid or liquefiable fats and/or oils for lubricating passage of the meat product through the tubes of the shell-and-tube heat exchanger 20.

Within the heat exchanger, the size of the tubes is selected in order to achieve heating or rendering of the fat portion of the trimmings. At the same time, the temperature of the heat exchanger medium is reduced because of the smaller diameter and larger heat transfer area of the tubes as permitted by the invention. The heat exchanger medium need only be marginally higher in temperature than the final desired temperature of the meat product, thus preventing harmful effects or denaturing of the meat product due to excessive heat. For example, the temperature of the water or other heating medium within the heat exchanger may be regulated in order to heat the trimmings just above the rendering temperatures for the fat portion. With trimmings from beef, the temperature of the trimmings is raised to at least approximately 95 ®-100° F. With other meat products including fat portions subject to liquefaction at higher or lower temperatures, the temperature within the heat exchanger could accordingly be increased or reduced. The heat exchanger in combination with the extruder provides a much more continuous process with reduced dwell time and mechanical working of the meat (as compared with kettles, surge tanks and the like used in the prior art).

As the lean meat portion and rendered or liquefied fat portion of the meat trimmings pass from the heat exchanger, the lean meat portion is removed by the free oil separator 22 and final separator 23 which preferably comprises a mechanical type device. The separator 23 includes a perforated or mesh-type endless belt 44 trained about rollers 46 and 48. With the combination of lean meat and liquefied fat being deposited on the rotating belt 44, compression rolls 50 and 52 tend to urge the liquid fat portion through the belt while the solid lean meat portion is retained upon the surface of the belt. The lower compression roll 52 could of course also be replaced by an apron or the like for facilitating pressing engagement between the upper compression roll 50 and the endless belt. The liquid fat component passing through the belt is collected at 54 and delivered for further processing (not shown) by means of the conduit 24. The solid lean meat portion is then removed from the belt for example by means of a knife edge 56 from where it is delivered to a refrigerating means 26.

As noted above, the free oil separator 22 may be formed as an integral portion of the final separator 23. For example, with the final separator 23 being substantially lengthened, the free oil separator 22 could be replaced by a portion of the endless belt 44 prior to its passage between the compression rolls 50 and 52. With such an arrangement, the heated meat product from the heat exchanger 20 could be merely deposited upon the endless belt 44 with free oil being allowed to pass downwardly through the perforated belt. Thereafter, the remaining portion of the meat product could pass between the compression rolls 50 and 52 in the same manner described above for final removal or separation of the liquefied portion.

The refrigerating means 26 preferably consists of a drum freezer of a type described for example in U.S. Pat. No. 4,098,095, issued July 4, 1978 to the inventor of the present invention. Accordingly, the disclosure of that patent is incorporated herein as though set out in its entirety. However, in order to facilitate understanding of the invention, the refrigerating means 26 briefly includes a rotating drum 58 forming an annular heat exchange surface 60 about its periphery. The lean meat solids from the separator 22 are applied to a nip 62 formed between the drum 58 and an application roll 64. The application roll 64 causes the lean meat solids to be extruded as a sheet upon the heat exchange surface 60 of the drum. During rotation of the drum, the lean meat solids are refrigerated or frozen and then removed by means of a knife-edge 66. The frozen lean meat solids are then carried by a conveyor 68 to a processing station 70 which may include for example packaging or means for forming the lean meat solids into a selected food product of the type referred to above.

It is believed that the method of the invention is clearly apparent from the preceding description. However, the method briefly includes the steps of extruding the meat products within the device 12 and forcing them through the die openings 38 of the outlet or extrusion plate 36 in combination with action of the knife means 21. With the conduits 16 being respectively interconnected between the die openings 38 and the separate tubes 18 of the heat exchanger 20, operation of the extrusion device 12 forces the meat trimmings through the conduits and through the tubes of the heat exchanger.

As the extruded meat trimmings pass through the heat exchanger, they are either heated or cooled but preferably heated in order to render fat portions which also serve to provide lubrication during passage of the meat trimmings through the heat exchanger tubes. After the fat portion of the trimmings is substantially rendered or liquefied, the solid lean meat portion is recovered in the separator 22 and immediately passes to the refrigerating means 26 in order to refrigerate or freeze the lean meat solids and prevent or minimize bacterial growth therein.

With the apparatus being employed for cooling the meat product, the meat product will be substantially cooled within the heat exchanger 20 and thus conditioned for further processing or packaging for example after exiting the passages 18 of the heat exchanger. As an example, the cooling method referred to immediately above could be employed for example in processing lean meat obtained from freshly slaughtered carcasses (commonly termed "hot boned meat") for use in forming hamburger or the like. In such an application, the hot boned meat would be divided into pieces as described above and reduced from a typical temperature of 100° to approximately 40° F. or even lower.

Various modifications and additions will be apparent from the preceding description. Accordingly, the scope of the invention is defined only by the following appended claims.

What is claimed is:

1. In a method for processing a meat product material including muscle and connective tissue with minimum physical working thereof, said product characterized by the presence of individual pieces which cannot readily be caused to flow through restricted passages of processing equipment, the steps comprising extruding the pieces of the meat product with extruding means and communicating said extruding means directly with outlet means comprising a plurality of die openings, communicating the die openings directly with corresponding passages in a shell-and-tube type heat exchanger, passing the extruded meat product pieces through the heat exchanger passages in a first-in, first-out manner, facilitating passage of the pieces of meat product into the die openings by knife means arranged for cutting movement adjacent inlet ends of the die openings in order to prevent blockage of the die openings by the meat product pieces, whereby said extruding step and said knife means cooperate to permit the pieces of meat product to be forced into and through said die openings and passages in said shell-and-tube type heat exchanger, operating the heat exchanger to change the temperature of the meat product to a selected level during passage of the meat product through said heat exchanger, and receiving the meat product from the heat exchanger at said selected temperture level for further processing.

2. The method of claim 1 further comprising the step of dividing the meat product into pieces of reduced size with a minimum of physical working, the reduced size of said pieces being selected for permitting acceptance by said extruding means.

3. The method of claim 1 wherein said extruding means is a grinder, said outlet means being an extruding plate forming said plurality of die openings through which the pieces of meat product are forced into the respective passages of said shell-and-tube type heat exchanger, said knife means being a rotating part of said grinder.

4. The method of claim 1 wherein said operating step comprises heating of the meat product in said heat exchanger, the meat product including a liquefiable portion sufficient to provide lubrication during passage of the meat product through the passages of said heat exchanger.

5. The method of claim 1 wherein said operating step comprises cooling of the meat product in said heat exchanger, the meat product including a liquefiable portion for providing lubrication during passage of the meat product through the passages of said heat exchanger.

6. The method of claim 1 wherein said heat exchanger operating step comprises the step of heating the meat product in said heat exchanger; and further comprising the step of thereafter refrigerating the meat product in order to limit bacterial growth.

7. The method of claim 6 further comprising the step of separating a fat portion from a lean meat portion of the heated meat product before carrying out said refrigerating step.

8. The method of claim 7 wherein the lean meat portion is applied to a heat exchange surface of a drum-type freezer for carrying out said refrigerating step, said refrigerated lean meat portion then being removed from said drum-type freezer for further processing.

9. The method of claim 7 wherein the meat product pieces comprise trimmings obtained from processing of animal carcasses and containing a substantial fat portion, said heating step being carried out for rendering part of the fat portion from said trimmings.

10. The method of claim 9 wherein the lean meat portion comprises at least approximately 2% of the trimmings.

11. The method of claim 10 wherein the lean meat portion is refrigerated immediately after separation from the fat portion in order to limit bacterial growth.

12. In a method for processing a meat product with minimum physical working thereof, said product characterized by the presence of individual pieces having a substantial amount of fibrous components including muscle and connective tissue tending to amass and block the inlet portions of restricted passages in processing equipment, the steps comprising extruding the pieces of meat product with extruding means being directly communicated with outlet means comprising a plurality of die openings, communicating the die openings directly with corresponding passages in a shell-and-tube type heat exchanger, passing the extruded meat product pieces through the heat exchanger passages in a first-in, first-out manner, facilitating passage of the pieces of meat product into and through said die openings by knife means arranged for cutting movement adjacent inlet ends of said die openings in order to prevent blockage of said die openings by the meat product pieces, whereby direct force applied to the extruded meat product pieces by said extruding means and cooperation of said knife means permit the pieces of meat product to be forced into and through said die opening and passages in said shell-and-tube heat exchanger, and operating said heat exchanger to change the temperature of the extruded meat product to a selected level during passage of the meat product through said heat exchanger.

13. The method of claim 12 further comprising means for dividing the pieces of meat product to a further reduced size with a minimum of physical working, the reduced size of said pieces being selected for permitting acceptance by said extruding means.

14. The method of claim 12 wherein said extruding means is a grinder, said outlet means being an extruding plate forming said plurality of die openings through which the extruded meat product pieces are forced into said heat exchanger, said knife means being a rotating part of said grinder.

15. The method of claim 12 wherein said operating step comprises heating of the extruded meat product in said heat exchanger, the meat product including a liquefiable portion sufficient to provide lubrication during passage of the extruded meat product through the passages of said heat exchanger.

16. The method of claim 12 wherein said operating step comprises cooling of the extruded meat product in said heat exchanger, the extruded meat product including a liquefiable portion for providing lubrication during passage of the extruded meat product through said heat exchanger.

* * * * *